(12) United States Patent
Maria

(10) Patent No.: US 8,578,011 B2
(45) Date of Patent: Nov. 5, 2013

(54) SYSTEMS, METHODS, AND COMPUTER PROGRAM PRODUCTS FOR PROVIDING A REMOTE NON-IP-ADDRESSABLE DEVICE WITH AN IP STACK

(75) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 403 days.

(21) Appl. No.: 12/815,486

(22) Filed: Jun. 15, 2010

(65) Prior Publication Data
US 2011/0307539 A1  Dec. 15, 2011

(51) Int. Cl.
G06F 15/173 (2006.01)
G06F 15/16 (2006.01)
G06F 15/177 (2006.01)

(52) U.S. Cl.
USPC ........... 709/223; 709/202; 709/220; 709/227; 709/229

(58) Field of Classification Search
USPC ........................................................ 709/202
See application file for complete search history.

(56) References Cited

U.S. PATENT DOCUMENTS

| | | | |
|---|---|---|---|
| 6,957,275 B1 * | 10/2005 | Sekiguchi | 709/245 |
| 2004/0066923 A1 * | 4/2004 | Robinson | 379/166 |
| 2004/0179541 A1 * | 9/2004 | Godwin | 370/402 |
| 2005/0044348 A1 * | 2/2005 | O'Connell | 713/1 |
| 2005/0198629 A1 * | 9/2005 | Vishwanath | 717/174 |
| 2005/0239497 A1 * | 10/2005 | Bahl et al. | 455/552.1 |
| 2007/0101118 A1 * | 5/2007 | Raghunath et al. | 713/2 |
| 2007/0162577 A1 * | 7/2007 | Schow et al. | 709/223 |
| 2007/0217371 A1 * | 9/2007 | Sinha | 370/338 |
| 2008/0028035 A1 * | 1/2008 | Currid et al. | 709/217 |
| 2008/0028052 A1 * | 1/2008 | Currid et al. | 709/222 |
| 2008/0059785 A1 * | 3/2008 | O'Connell | 713/2 |
| 2009/0034418 A1 * | 2/2009 | Flammer et al. | 370/238 |
| 2009/0034419 A1 * | 2/2009 | Flammer et al. | 370/238 |
| 2009/0132797 A1 * | 5/2009 | Lo | 713/2 |
| 2009/0313290 A1 * | 12/2009 | Narayanan et al. | 707/102 |
| 2010/0157897 A1 * | 6/2010 | Yoon et al. | 370/328 |
| 2011/0010443 A1 * | 1/2011 | Nagatomo | 709/223 |
| 2011/0194539 A1 * | 8/2011 | Blasinski et al. | 370/336 |
| 2011/0208366 A1 * | 8/2011 | Taft | 700/295 |

OTHER PUBLICATIONS

Esser, Albert A.; "Smartgrid: Challenges/Opportunies", http://econdius.com/documents/smartgrid.html.

* cited by examiner

*Primary Examiner* — Richard G Keehn
(74) *Attorney, Agent, or Firm* — Parks IP Law LLC; Jennifer P. Medlin, Esq.

(57) ABSTRACT

A system for dynamically provisioning a remote device with an Internet Protocol (IP) stack using a custom IP agent is disclosed. The system includes a Master Catalog storing a profile identifying an operating system and a native protocol of the device. The system also includes a Provisioning Master in communication with the Master Catalog. The Provisioning Master is configured to receive the device profile from the Master Catalog and generate the custom IP agent based on at least the device profile to allow communication of IP services to/from the remote device. The Provisioning Master is also configured to establish a data link to the remote device using the native protocol of the remote device, and install the IP agent onto the remote device, using the native protocol of the remote device, to form the IP stack for the remote device, thereby enabling communication of IP services to/from the remote device.

14 Claims, 5 Drawing Sheets

US 8,578,011 B2

SYSTEMS, METHODS, AND COMPUTER PROGRAM PRODUCTS FOR PROVIDING A REMOTE NON-IP-ADDRESSABLE DEVICE WITH AN IP STACK

TECHNICAL FIELD

The present disclosure relates generally to provisioning devices with an Internet Protocol (IP) stack and, more particularly, to provisioning remote non-IP-addressable devices with an IP stack using a custom IP agent.

BACKGROUND

Devices of smart grid and other telemetry systems communicate with a core network, such as a core network of a utility (e.g., an electric company or water district). The devices communicate with the network for various purposes, including receiving instructions for operation and reporting measurements. Many devices have protocol stacks enabling communications by various open protocols, such as Wi-Fi® or Zigbee® (Wi-Fi is a registered trademark of the Wi-Fi Alliance, of Austin, Tex., and Zigbee is a registered trademark of ZigBee Alliance, of San Ramon, Calif.). Some devices include Internet Protocol (IP) stacks enabling communications of IP services to and from the remote device.

Communication via IP services is an increasingly preferred method of communicating with remote devices, such as smart grid devices. There are a few, generally undesirable, options for communicating with devices lacking an IP stack. A technician can travel to the site of the device and replace the entire device with one having an IP stack. As another option, the remote device may continue operation without an IP stack and forego the benefits available by way of using IP services.

SUMMARY

The present disclosure relates to a system for dynamically provisioning a remote device with an Internet Protocol (IP) stack using a custom IP agent. The system includes a Master Catalog for storing a device profile identifying an operating system of the remote device and a native protocol by which the remote device communicates. The system also includes a Provisioning Master in communication with the Master Catalog. The Provisioning Master is configured to receive the device profile from the Master Catalog and generate the custom IP agent based on at least the device profile to enable communication of IP services to/from the remote device. The Provisioning Master is also configured to establish a data link to the remote device using the native protocol of the remote device, and install the IP agent onto the remote device to form the IP stack. IN this way, the communication of IP services to/from the remote device is possible.

In another aspect, the present disclosure relates to a method for dynamically provisioning a remote device with an Internet Protocol (IP) stack using a custom IP agent. The method includes storing in a Master Catalog a device profile identifying an operating system of the remote device and a native protocol by which the remote device communicates. The method also includes a Provisioning Master, in communication with the Master Catalog, receiving the device profile from the Master Catalog. The method further includes the Provisioning Master generating the custom IP agent based on at least the device profile and the Provisioning Master establishing a data link to the remote device using the native protocol of the remote device. And the method includes the Provisioning Master installing the IP agent onto the remote device using the native protocol of the remote device, to form the IP stack for the remote device, thereby allowing communication of IP services to/from the remote device.

In yet another aspect, the present disclosure relates to a computer-readable medium for dynamically provisioning a remote device with an Internet Protocol (IP) stack using a custom IP agent. The computer-readable medium has instructions that, when executed by a processor, cause the processor to perform various steps including receiving a device profile from a Master Catalog, the device profile including an operating system for the device and a native protocol by which the device communicates. The instructions of the computer-readable medium also cause the processor to generate the custom IP agent based on at least the device profile and establish a data link to the remote device using the native protocol of the remote device. Further, the instructions of the computer-readable medium cause the processor to install the IP agent onto the remote device, using the native protocol of the remote device, to form the IP stack for the remote device, thereby allowing communication of IP services to/from the remote device.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

Overview of the Disclosure

In various embodiments, the present disclosure describes systems, methods, and computer-readable mediums (or computer program products) configured to, using an intelligent IP agent, dynamically provision a remote device with an Internet Protocol (IP) stack. More specifically, the disclosure describes a Provisioning Master server that generates the IP agent for installing on to the remote device. The IP agent forms the IP stack allowing the remote device to communicate using IP services.

System for Provisioning IP Agent

Figure 1:
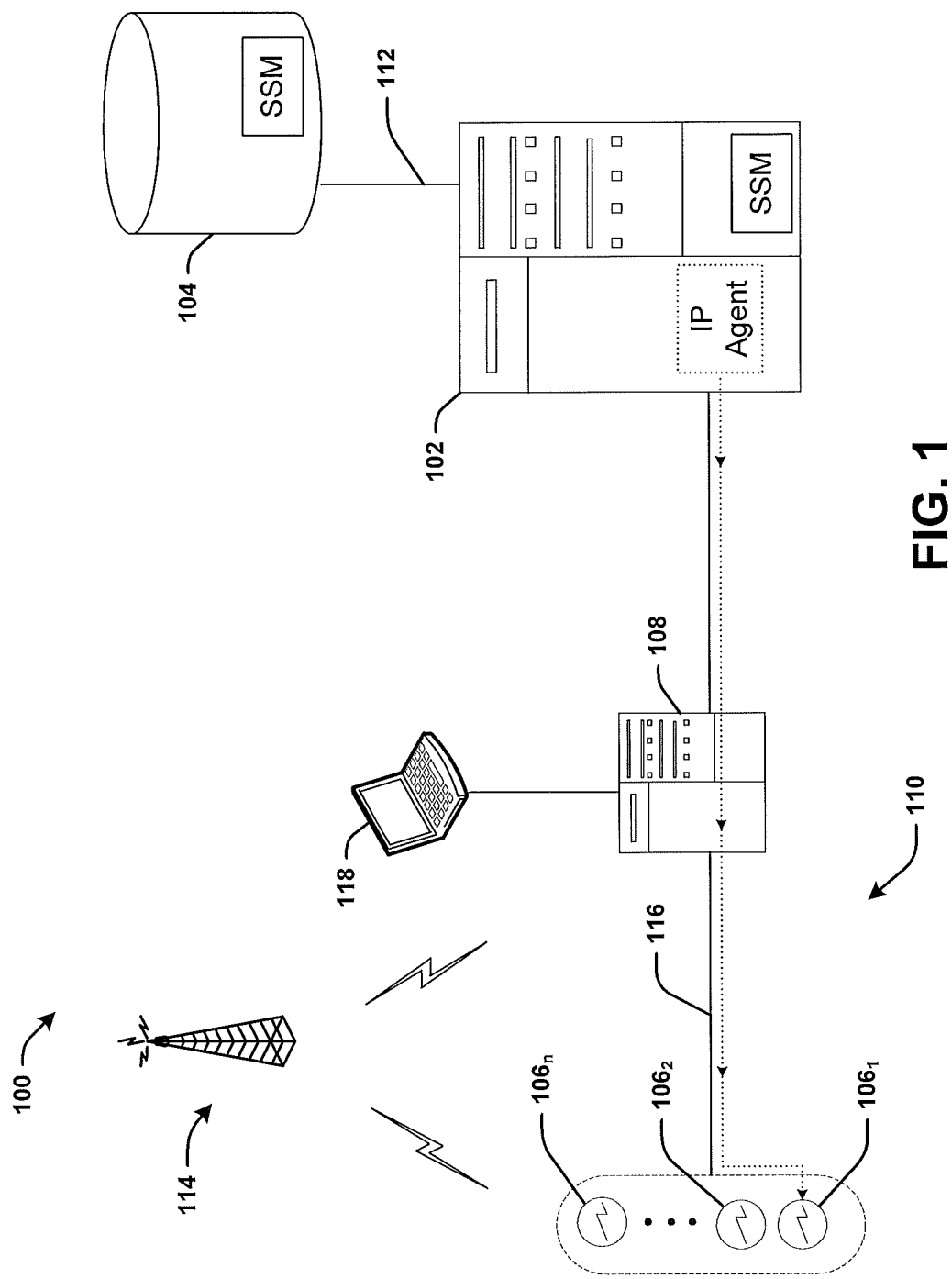
FIG. 1 illustrates an exemplary system for dynamically provisioning a remote device with an Internet Protocol (IP) stack using a custom IP agent, according to an embodiment of the present disclosure.

Referring now to the drawings, FIG. 1 shows a system 100 including a Provisioning Master 102, or PM, in communication with a Master Catalog 104, or MC. The system 100 may also be referred to as an Intelligent Protocol and Provisioning Architecture (IPPA). The Provisioning Master 102 includes one or more computer servers, located in one or more locations and, in some embodiments, functions as the Intelligent Protocol Primary Engine (IPPE) of the IPPA. Thus, in some embodiments, the Provisioning Master 102 includes a single server, and in other embodiments, the Provisioning Master 102 includes more than one server operating together at the same or different locations.

As described in more detail below, the Provisioning Master 102 is configured to provision a non-IP-addressable remote device $106_1$ with an intelligent provisioning agent, or PA. The PA is also referred to herein as an IP agent. The IP agent enables the device $106_1$ to communicate via IP services.

In some embodiments of the present disclosure, the Provisioning Master 102 installs the IP agent onto the remote device $106_1$ by way of an application server 108. The application server 108 may include or be in communication with a meter data management system (MDMS) and/or middleware. As an example, in one embodiment, the Provisioning Master 102 downloads the IP agent to the remote device $106_1$ by way of application services of an application server 108 including middleware. In some embodiments, the device $106_1$ and application server 108 are parts of a device network 110, such as a core utility network, including multiple devices $106_1$, $106_2$ ... $106_n$, where n is an integer.

The system 100 may be used in connection with various types of device networks 110 to provision IP agents to various types of devices 106, including, for example, devices of a smart grid. Generally, a smart grid is a network for enhancing the distribution of utilities, such as electricity, water, and gas, by automating the monitoring of and controlling the distribution of the utility. Examples of remote devices 106 include meters, gauges, controllers, demand response devices, capacitor banks, and inductor banks, such as those used in connection with utilities.

The Master Catalog 104 includes a database storing device profiles (not shown in detail) of one or more devices 106. For applications in which the Master Catalog 104 is used in connection with a network 110 of devices 106, such as a smart grid having the devices 106, the Master Catalog 104 stores a device profile for each device 106, or select devices 106 of the network 110.

In some implementations, the Master Catalog 104 is populated with device profiles as part of an initial setup between the IPPA, or system 100. The profiles may be received by the Master Catalog 104 from the system 100 or the respective devices 106, in response to a request for the profiles or another trigger in the initialization process. For generating the IP Agent for the device $106_1$, the Provisioning Master 102 may query the Master Catalog 104 for the profile for the device $106_1$, or the Master Catalog 104 may provide the profile to the Provisioning Master 102 without request from the Provisioning Master 102.

In some embodiments, the Provisioning Master 102 receives a request from a device $106_1$ or the network 110 to provide the device $106_1$ with the IP Agent. The request may include various pieces of information, such as information identifying the device, a type of device, and other characteristics of the device $106_1$. In some embodiments, the Provisioning Master 102 is configured and authorized to access the device $106_1$ or other network 110 resources to obtain the information about the device $106_1$, including information that the Provisioning Master 102 needs for creating for tailoring the IP Agent for use with the device $106_1$. The Provisioning Master 102 is configured to use the information received from the device $106_1$ or the network 110 to create or update the profile corresponding to the device.

In some embodiments, the device profile identifies any one or any combination of characteristics associated with the remote device $106_1$, including: (1) an operating system; (2) a native protocol used by the operating system to send/receive communications; (3) characteristics related to physical or IP ports of the device (e.g., how many, what types); (4) applications services; and (5) security information.

The Provisioning Master 102 is connected to the Master Catalog 104 by a data link 112 for use in providing information to and receiving information from the Master Catalog 104. The data link 112 may include a wireline connection and/or a wireless connection. Exemplary wireline connections include cable, telephone, fiber optic, and power lines. Exemplary wireless connections include cellular, Wi-Fi, WiMax, and satellite.

For security, in some embodiments the Provisioning Master 102 communicates with the Master Catalog 104 using a private, proprietary protocol, which is secured to use by authorized entities. In lieu of such proprietary protocol or in addition, it is contemplated that the system 100 in some embodiments includes one or more security features such as a firewall (not illustrated in detail).

The Provisioning Master 102 is configured to generate a custom IP agent to be installed onto the operating system of the remote device $106_1$. Particularly, the Provisioning Master 102 includes applications or other software configured to generate an IP agent tailored to specifications of the remote device $106_1$, such as to the operating system and/or the native protocol of the remote device $106_1$.

The IP agent is a computer application. When installed by the Provisioning Master 102 onto the device $106_1$, the IP agent attaches to the operating system of the remote device $106_1$. In some embodiments, the IP agent is configured and dynamically installed so the IP agent operates seamlessly with the operating system of the remote device $106_1$. Dynamic installation is performed automatically by the IP agent, without external input, such as manual work during the installation.

In some embodiments the IP agent is configured to attach to the operating system of the remote device $106_1$ in such a manner that the operating system is not aware that the IP agent has attached to it. For example, in these embodiments, the IP agent need not request permission or assistance from the operating system for the attachment.

The IP agent functions as an extension of the operating system of the remote device $106_1$. Once installed, the IP agent dynamically creates an IP stack, with associated extension and driver. In operation, the IP agent uses the driver to transmit information, in the form of IP services, using the IP protocol to a wireless network 114 or wireline network 116, such as a wireless or wireline network of a telecommunications carrier.

Particularly, when installed, the IP agent attaches to the operating system of the remote device $106_1$ so that communications from the operating system are intercepted by the IP agent and transmitted according to the IP protocol as IP services using the driver of the formed IP stack. Further, the remote device $106_1$ is now able to receive, via the wireless network 114 or wireline network 116, IP services addressed to the extension of the IP stack formed by the IP agent.

In some embodiments, the system 100 includes a Secure Systems Manager, or SSM. The Secure Systems Manager is a software module installed in part on the Provisioning Master 102 and in part on the Master Catalog 104. The portion of the Secure Systems Manager in the Provisioning Master 102 includes instructions for performing the functions of the Secure Systems Manager, as described herein. The portion of the Secure Systems Manager residing on the Master Catalog 104 includes the records used by the portion in the Provisioning Manager 102 to execute the function.

The Secure Systems Manager controls interactions amongst any two or more of the Provisioning Master 102, the Master Catalog 104, the remote devices 106, and the device network 110, such as a core utility network. For example, the Secure Systems Manager controls security between all or some of the Provisioning Master 102, the Master Catalog 104, the remote devices 106, and the device network 110.

The Secure Systems Manager allows an operator, using a computer interface 118, to set levels of security for data transmissions between the various points of the system 100 and network 110. The Secure Systems Manager is also configured to allow the operator to identify rules for the Provisioning Master 102, create new IP agents, and update IP agents.

Security settings identify, for example, various system permissions and rules, such as the personnel who can log on to the Provisioning Manager 102, how the Provisioning Manager 102 interfaces with the device network 110 (e.g., core utility network), the personnel who can download or upload information, how data is loaded between components of the systems 100 and network 110. In one embodiment, the Secure Systems Manager is configured so that the network 110 to which the remote device $106_1$ belongs has exclusive control of the Provisioning Master 102 after the IP agent has been installed.

As mentioned above, the Provisioning Master 102 may include one or more computer servers located in one or more locations. In some embodiments, the Provisioning Master 102 is positioned remote to the device network 110, such as the core utility network. In some embodiments, the Provisioning Master 102 is a part of the device network 110. The Master Catalog 104 may be co-located with the Provisioning Master 102, or remote to the Provisioning Master 102.

Method for Provisioning IP Agent

Figure 2:
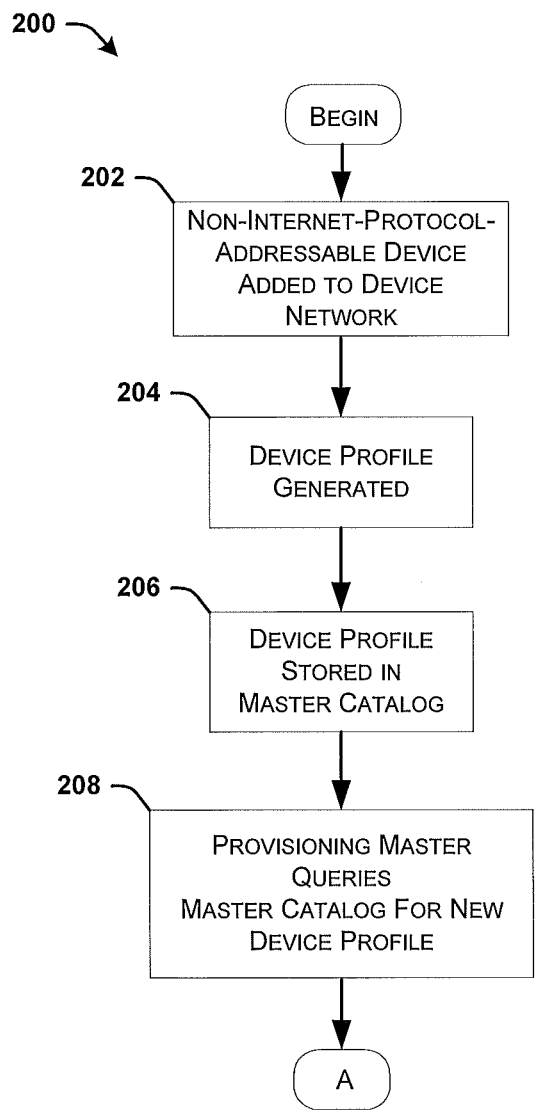
FIG. 2 illustrates an exemplary first portion of a method for dynamically provisioning a remote device with an Internet Protocol (IP) stack using an IP agent, according to an embodiment of the present disclosure.
Figure 3:
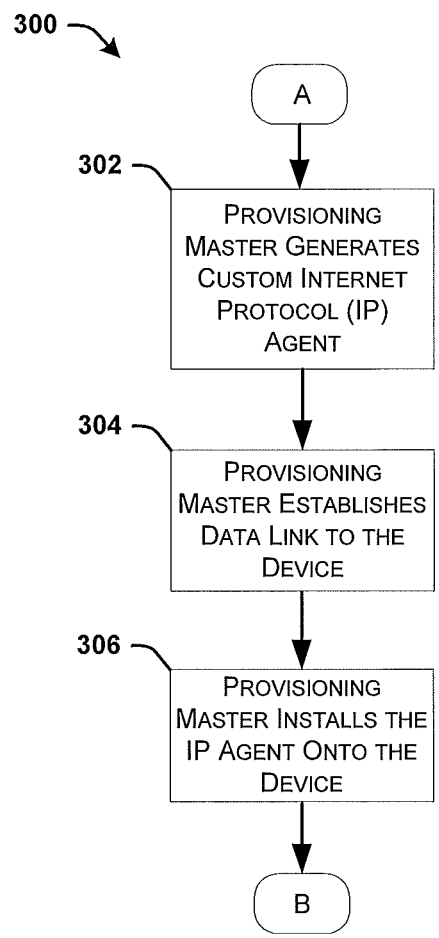
FIG. 3 illustrates an exemplary second portion of a method for dynamically provisioning a remote device with an Internet Protocol (IP) stack using an IP agent, according to an embodiment of the present disclosure.
Figure 4:
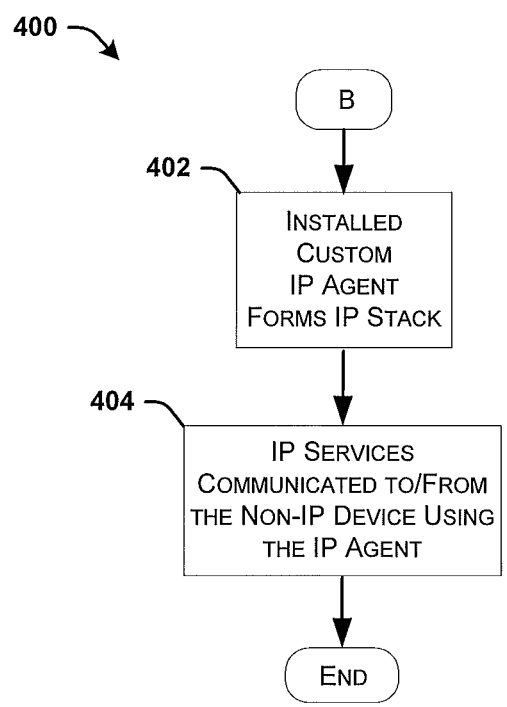
FIG. 4 illustrates an exemplary method for dynamically provisioning a remote device with an Internet Protocol (IP) stack using an updated IP agent, according to an embodiment of the present disclosure.

FIG. 2 shows a first portion of an exemplary process for dynamically provisioning a remote device with an Internet Protocol (IP) stack using an IP agent, according to an embodiment of the present disclosure. FIGS. 3 and 4 show second and third portions of the same process. It should be understood that the steps of the methods 200, 300, 400 are not necessarily presented in any particular order and that performance of some or all the steps in an alternative order is possible and is contemplated.

The steps of the methods 200, 300, 400 have been presented in the demonstrated order for ease of description and illustration. Steps can be added, omitted and/or performed simultaneously without departing from the scope of the appended claims. It should also be understood that the illustrated methods 200, 300, 400 can be ended at any time. In certain embodiments, some or all steps of this process, and/or substantially equivalent steps are performed by execution of computer-readable instructions stored or included on a computer-readable medium, such as of the Provisioning Master 102, the Master Catalog 104, and/or other components of the system 100 disclosed herein.

As shown in FIG. 2, the method 200 begins and flow proceeds to block 202, whereat a new device $106_1$ is added to the device network 110, such as a smart grid of devices operated by a utility. At step 204, a device profile corresponding to the device $106_1$ is generated.

As described above, the device profile, in some embodiments, identifies an operating system of the remote device $106_1$ and/or a native protocol used by the operating system to send/receive communications to/from the remote device $106_1$. In one embodiment, the device profile is generated before the remote device $106_1$ attaches to the device network 110, or generated after the device $106_1$ attaches to the device network 110. In one embodiment, the device profile is generated in response to the device $106_1$ being added to the device network 110.

Once generated, the device profile is stored at the Master Catalog 104 at step 206. At step 208, the Provisioning Master 102 queries the Master Catalog 104 via the secure data link 112 for the device profile. As described above and below in further detail, the Provisioning Master 102 uses the device profile to generate the custom IP agent for the device $106_1$. After step 208, flow proceeds to the method of FIG. 3, wherein the custom IP agent is generated and implemented.

As shown in FIG. 3, the method 300 begins and flow proceeds to block 302, whereat the Provisioning Master 102 generates the IP agent customized to the device $106_1$. Particularly, the Provisioning Master 102 generates the IP agent for the device $106_1$ based on characteristics of the device identified in the device profile stored and received from the Master Catalog 104. For example, in some embodiments, the Provisioning Master 102 generates the IP agent based on the operating system and/or the native protocol of the device $106_1$.

At step 304, the Provisioning Master 102 establishes a data link to the remote device $106_1$. For some implementations wherein the remote device $106_1$ is a part of a device network 110, such as a smart grid, the step 304 of establishing the data link includes the Provisioning Master establishing a direct or indirect data link to the device network 110.

The data link may be established via wireless or wireline connection. At step 306, the Provisioning Master 102 installs the custom IP agent onto the remote device $106_1$, wherein the IP agent attaches to the operating system of the remote device $106_1$. As described above, the IP agent is in some embodiments configured and dynamically installed so the IP agent operates seamlessly with the operating system of the remote device $106_1$ following installation.

As shown in FIG. 4, at step 402, the installed IP agent dynamically forms an IP stack to enable communication of IP services to and from the device $106_1$. The dynamic formation here is occasioned by the IP agent forming the IP stack automatically, without external input, such as manual work during the installation. The IP stack may include, for example, a typical suite associated with a typical IP protocol suite, or Transmission Control Protocol and Internet Protocol suite (TCP/IP). The stack includes an associated extension, or IP address, for receiving incoming, IP-addressed messages, and a driver for transmitting messages in the form of IP services.

At step 404, the IP agent, using the IP stack facilitates communication of IP services to/from the remote device $106_1$. Regarding outgoing messages of the remote device $106_1$, the IP agent intercepts the message being sent out by the operating system and transmits them as IP services using the driver of the IP stack. Regarding messages incoming to the remote device $106_1$, the IP agent receives all messages addressed to the extension now associated with the IP stack, and thus the remote device $106_1$, and forwards the message to the operating system of the device $106_1$. In this way, the non-IP device $106_1$ is converted into a device capable of supporting IP communications. The method 400 may end.

Method for Updating IP Agent

Figure 5:
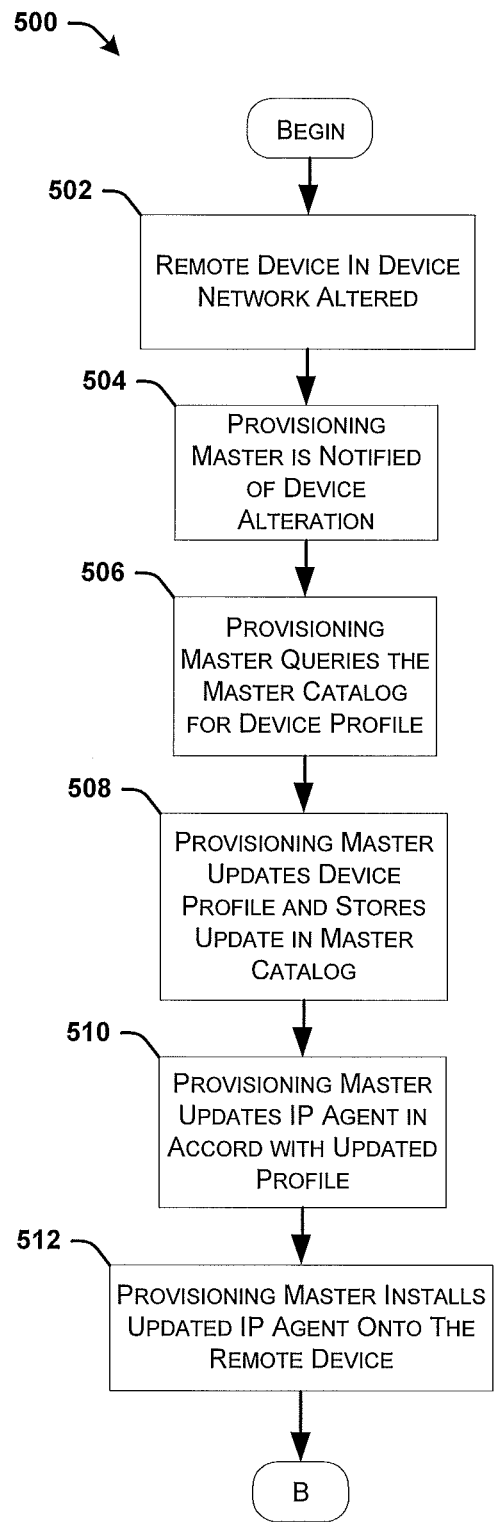
FIG. 5 illustrates an exemplary method for updating an IP agent previously attached to a remote device, according to an embodiment of the present disclosure.

FIG. 5 shows an exemplary method 500 for updating an IP agent that has been attached to a remote device $106_1$ according to the methods 200, 300, 400 described above. It should be understood that the steps of the method 500 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated method 500 can be ended at any time. In certain embodiments, some or all steps of this process, and/or substantially equivalent steps are performed by execution of computer-readable instructions stored or included on a computer-readable medium, such as memory (not illustrated in detail) of the Provisioning Master 102 and/or other components of the systems or networks 100, 110 disclosed herein.

As shown in FIG. 5, the method 500 begins and flow proceeds to block 502, whereat the remote device $106_1$ is altered. An alteration may include, for example, a change to the operating system of the remote device $106_1$, or various other features of the device $106_1$, affecting communications via the IP agent. At step 504, the Provisioning Master 102 is notified of the alteration to the remote device $106_1$. In response to being notified about the alteration, the Provisioning Master 102, at step 506, queries the Master Catalog 104 for the corresponding device profile and, at step 508, updates the profile and stores the updated profile in the Master Catalog 104.

At step 510, the Provisioning Master 102 updates the IP agent associated with the remote device $106_1$. In one embodiment, the Provisioning Master 102 updates the IP agent by generating a new IP agent configured to the updated device profile. In another embodiment, the Provisioning Master 102 updates the IP agent by altering the IP agent associated with the remote device $106_1$, such as by adding, removing, and/or changing portions of the IP agent.

At step 512, the Provisioning Master 102 installs the updated IP agent onto the remote device $106_1$. In one embodiment, the Provisioning Master 102 installs the updated IP agent as a whole onto the remote device $106_1$. In one contemplated embodiment, the Provisioning Master 102 installs the updated IP agent by transmitting one or more update messages to the IP agent already associated with the device. In this embodiment, the messages and IP agent are configured so that the IP agent is updated in response to receiving the update messages.

Once installed, the updated IP agent dynamically forms an updated IP stack, such as described above in connection with the method 400 shown in FIG. 4. In some embodiments, the IP agent forms the updated IP stack as a whole, and in other embodiments, by generating an updated IP stack to replace the previous IP stack.

In one contemplated embodiment, the IP agent forms the updated IP stack by altering the previous IP stack. The updated IP stack differs in one or more ways from the previous IP stack, such as by having a different IP address and/or driver than the previous IP stack. As described above in connection with the IP stack formed in the method 400 of FIG. 4, the updated IP stack enables communication of IP services to and from the now altered device $106_1$.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system for dynamically provisioning a remote device, which is not addressable via an Internet Protocol (IP), with an IP stack, the system comprising:
   a processor; and
   a memory having instructions stored thereon which, when executed by the processor, cause the processor to perform operations comprising:
      receiving a device profile from a database, the device profile identifying an operating system of the remote device and a native protocol by which the remote device communicates;
      generating a custom IP agent based on the device profile to allow communication of IP services to/from the remote device;
      establishing a data link to the remote device using the native protocol of the remote device;
      causing the custom IP agent to be installed onto the remote device, using the native protocol of the remote device, to form the IP stack for the remote device, thereby allowing communication of IP services to/from the remote device;
      generating an updated custom IP agent responsive to a notification of an alteration in the device profile that affects communications via the custom IP agent;
      wherein the IP stack formed by installation of the IP agent includes an IP address and an IP driver for use in receiving/sending IP services;

wherein the alteration in the device profile includes a change to the operating system of the remote device, and wherein the updated custom IP agent includes an updated IP stack having at least one of a different IP address and a different IP driver than the IP address and the IP driver included in the IP stack of the custom IP agent; and causing the updated custom IP agent to be installed onto the remote device.

2. The system of claim 1, wherein:

the remote device is a part of a smart grid network;

the database stores device profiles for each device in the smart grid network; and the memory further has instructions stored thereon which cause the processor to communicate with the smart grid network to establish the data link and install the IP agent.

3. The system of claim 1, wherein the memory further has instructions stored thereon which, when executed by the processor, cause the processor to control interactions with a network to which the remote device belongs.

4. The system of claim 3, wherein the memory further has instructions stored thereon which, when executed by processor, cause the processor to allow an operator to identify rules for provisioning, create new IP agents, and update IP agents.

5. The system of claim 1, wherein the processor is included in a server that is part of a device network to which the remote device belongs.

6. The system of claim 1, wherein the processor is included in a server that is part of a carrier network providing IP services to the remote device after the IP agent is installed.

7. A method for dynamically provisioning a remote device, which is not addressable via an Internet Protocol (IP), with an IP stack, the method comprising:

receiving a device profile from a database, the device profile identifying an operating system of the remote device and a native protocol by which the remote device communicates;

generating, by a processor, a custom IP agent based on the device profile;

establishing a data link to the remote device using the native protocol of the remote device;

causing, by the processor, the custom IP agent to be installed onto the remote device, using the native protocol of the remote device, to form the IP stack for the remote device, thereby allowing communication of IP services to/from the remote device;

generating an updated custom IP agent responsive to a notification of an alteration in the device profile that affects communications via the custom IP agent;

wherein the IP stack formed by the installation of the IP agent includes an IP address and an IP driver for use in receiving/sending IP services;

wherein the alteration in the device profile includes a change to the operating system of the remote device, and wherein the updated custom IP agent includes an updated IP stack having at least one of a different IP address and a different IP driver than the IP address and the IP driver included in the IP stack of the custom IP agent; and causing the updated custom IP agent to be installed onto the remote device.

8. The method of claim 7, wherein:

the remote device is part of a smart grid network; and establishing the data link and causing the IP agent to be installed include connecting to the smart grid network.

9. The method of claim 7, further comprising controlling interactions with a network to which the remote device belongs.

10. The method of claim 9, further comprising allowing an operator to identify rules for provisioning, create new IP agents, and update IP agents.

11. The method of claim 7, wherein the processor is included in at least one of server that is part of a device network to which the remote device belongs and a server that is part of a carrier network providing IP services to the remote device after the IP agent is installed.

12. A non-transitory computer-readable storage medium for dynamically provisioning a remote device, which is not addressable via an Internet Protocol (IP), with an IP stack, the non-transitory computer-readable medium having instructions recorded thereon that, when executed by a processor, cause the processor to perform operations comprising:

receiving a device profile from a database, the device profile identifying an operating system for the device and a native protocol by which the device communicates;

generating the custom IP agent based on the device profile;

establishing a data link to the remote device using the native protocol of the remote device;

causing the custom IP agent to be installed onto the remote device, using the native protocol of the remote device, to form the IP stack for the remote device, thereby allowing communication of IP services to/from the remote device;

generating an updated custom IP agent responsive to a notification of an alteration in the device profile that affects communications via the custom IP agent;

wherein the IP stack is formed to include an address and an IP driver for use in sending/receiving IP services;

wherein the alteration in the device profile includes a change to the operating system of the remote device, and wherein the updated custom IP agent includes an updated IP stack having at least one of a different IP address and a different IP driver than the IP address and the IP driver included in the IP stack of the custom IP agent; and causing the updated custom IP agent to be installed onto the remote device.

13. The non-transitory computer-readable medium of claim 12, wherein the instructions further cause the processor to control interactions with a network to which the remote device belongs.

14. The non-transitory computer-readable medium of claim 13, wherein the instructions further cause the processor to allow an operator to identify rules for provisioning, create new IP agents, and update IP agents.

* * * * *